United States Patent [19]
Nielsen

[11] Patent Number: 5,832,753
[45] Date of Patent: Nov. 10, 1998

[54] LOCK ASSEMBLY

[76] Inventor: Peter N. Nielsen, 21 Nut Island Ave., Quincy, Mass. 02169

[21] Appl. No.: 661,904

[22] Filed: Jun. 12, 1996

[51] Int. Cl.⁶ .................................................. E05B 71/00
[52] U.S. Cl. ................................. 70/38 A; 70/39; 70/52; 70/233; 70/422; 224/425; 224/935; 280/287
[58] Field of Search .......................... 70/422, 233, 38 A, 70/39, 52; 224/425, 935; 280/287

[56] References Cited

U.S. PATENT DOCUMENTS

| | | | |
|---|---|---|---|
| Re. 29,521 | 1/1978 | Pender | 70/234 |
| 374,592 | 12/1887 | Gilman | 70/50 |
| 2,508,302 | 5/1950 | Stue | 70/233 |
| 3,587,261 | 6/1971 | Berry | 70/422 |
| 3,636,739 | 1/1972 | Smedley | 70/58 |
| 3,774,421 | 11/1973 | Stephens, Jr. | 70/234 |
| 3,789,634 | 2/1974 | Brown | 70/186 |
| 3,814,462 | 6/1974 | Kelly | 280/287 |
| 3,824,541 | 7/1974 | Nolan | 340/65 |
| 3,886,770 | 6/1975 | Smith | 70/18 |
| 3,903,719 | 9/1975 | Katz | 70/227 |
| 3,910,081 | 10/1975 | Pender | 70/234 |
| 4,033,160 | 7/1977 | Mima | 70/233 |
| 4,044,577 | 8/1977 | Horlacher | 70/234 |
| 4,051,703 | 10/1977 | Plaiss | 70/371 |
| 4,152,231 | 5/1979 | Zane et al. | 70/18 |
| 4,188,808 | 2/1980 | Valdez | 70/233 |
| 4,241,594 | 12/1980 | Miller et al. | 70/38 A |
| 4,284,289 | 8/1981 | Loux | 280/289 |
| 4,379,393 | 4/1983 | Schott et al. | 70/233 X |
| 4,426,861 | 1/1984 | Chillis | 70/39 |
| 4,490,997 | 1/1985 | Hughes et al | 70/233 |
| 4,663,611 | 5/1987 | Humphrey | 340/542 |
| 4,674,306 | 6/1987 | Halpern | 70/DIG. 57 X |
| 4,773,239 | 9/1988 | Lowe et al. | 70/39 X |
| 4,776,188 | 10/1988 | Dalaba et al. | 70/49 |
| 4,801,121 | 1/1989 | Zunker | 248/551 |
| 4,807,453 | 2/1989 | Bernier et al. | 70/233 |
| 4,870,843 | 10/1989 | Lundberg | 70/233 |
| 5,010,746 | 4/1991 | Zane et al. | 70/233 X |
| 5,022,672 | 6/1991 | Kawai | 280/281.1 |
| 5,023,596 | 6/1991 | Sirman et al. | 340/571 |
| 5,157,954 | 10/1992 | Pietras | 70/227 |
| 5,251,464 | 10/1993 | Halter | 70/233 X |
| 5,278,538 | 1/1994 | Ainsworth et al. | 340/427 |
| 5,279,137 | 1/1994 | Orbell | 70/218 |
| 5,295,375 | 3/1994 | Jonas | 70/203 X |
| 5,325,689 | 7/1994 | Warner | 70/233 |
| 5,331,830 | 7/1994 | Su | 70/38 A |
| 5,417,092 | 5/1995 | Iu | 70/38 A |
| 5,438,854 | 8/1995 | Seraj | 70/38 |
| 5,467,620 | 11/1995 | Bryd, Jr. | 70/39 X |
| 5,558,349 | 9/1996 | Rubin | 70/233 X |
| 5,613,387 | 3/1997 | Shieh | 70/233 |

FOREIGN PATENT DOCUMENTS

| | | | |
|---|---|---|---|
| 92948 | 12/1922 | Austria | 70/39 |
| 2736984 | 3/1979 | Germany | 70/39 |
| 3046810 | 7/1982 | Germany | 70/233 |
| 8100478 | 9/1981 | Netherlands | 70/233 |
| 2141170 | 12/1984 | United Kingdom | 70/38 A |

*Primary Examiner*—Lloyd A. Gall
*Attorney, Agent, or Firm*—Pandiscio & Pandiscio

[57] ABSTRACT

A lock for a device having as a component thereof critical for use and/or operation thereof a tubular member, includes a tubular insert for disposition in a gap provided in the tubular member such that the insert becomes a portion of the tubular member, a lock member for encircling an anchoring structure and for making a locking connection to the insert. The insert is provided with a frangible portion which renders the insert more susceptible to breaking than the lock member. Upon breaking of the insert, the tubular member portion is broken to provide the device with a broken component critical to the operation thereof.

17 Claims, 4 Drawing Sheets

LOCK ASSEMBLY

BACKGROUND OF THE INVENTION

1. Field of the Invention

The invention relates to locking devices and is directed more particularly to a lock assembly for a device having as a component thereof critical to the use and/or operation thereof a tubular member.

2. Description of the Prior Art

Locks for devices having tubular frame elements, as for example, wheeled vehicles, such as bicycles, other cycles, wheel chairs, and the like, are well known in the art. Many locks for such devices include a discrete lock body and a lock member for encircling a portion of the device and a portion of an anchoring means, such as a post or tree. An example of such a lock may be seen in U.S. Pat. No. 3,886,770, issued Jun. 3, 1975, in the name of Gordan F. Smith. Other such locks include a lock body fixed to the device. Examples of such locks may be seen in U.S. Pat. No. 3,903,719, issued Sep. 9, 1975, in the name of Harold Katz; U.S. Pat. No. 4,033,160, issued Jul. 5, 1977, in the name of James J. Mina; U.S. Pat. No. 4,044,577, issued Aug. 30, 1977, in the name of Albert F. Horlacher; U.S. Pat. No. 4,051,703, issued Oct. 4, 1977, in the name of Charles E. Plaiss; U.S. Pat. No. 4,490,997, issued Jan. 1, 1985, in the name of Leland G. Hughes, et al; U.S. Pat. No. 4,776,188, issued Oct. 11, 1988, in the name of O. Gene Dalaba, et al; and U.S. Pat. No. 4,155,231, issued May 22, 1979, in the name of Michael S. Zane, et al. Still other locking systems are provided which are essentially permanent platforms to which a bicycle or other such device is secured. Examples of such locking systems may be seen in U.S. Pat. No. 4,807,453, issued Feb. 28, 1989, in the name of Denis Bernier, et al, and in U.S. Pat. No. 5,278,538, issued Jan. 11, 1994, in the name of Kathryn L. Ainsworth, et al. In other locking systems, locking components are housed within the frame of the device. An example may be seen in U.S. Pat. No. 3,774,421, issued Nov. 27, 1973, in the name of Raymond E. Stephans, Jr. In still another system, the frame of the device is subject to being taken apart, inserted in a locking loop fixed to an anchoring means, and lockingly put back together. See U.S. Pat. No. 3,814,462, issued Jun. 4, 1974, in the name of James J. Kelly.

Many of the commonly used locking systems include as a lock member for encircling an anchoring means, (1) a U-shaped member, typically of hardened steel, and often referred to as a "shackle," or (2) a steel cable. See the aforementioned '231 patent and U.S. Pat. No. 5,438,854, issued Aug. 8, 1995, in the name of Mohammad R. Seraj, for examples of shackles, and the aforementioned '160 patent, for an example of a cable. Such shackles and cable devices are relatively inexpensive, easy to operate, and easily understood by bicycle riders of all ages.

While in some cases, parts are stripped from a bicycle while the bicycle is locked to an anchoring means, by far the most prevalent scenario with respect to bicycle thefts is the theft of the entire bicycle in operative condition for a quick resale or immediate use. A common approach of thieves is to insert a jack between the legs of the U-shaped shackle or cable and, by operating the jack, expanding the shackle or cable until a leg thereof ruptures, permitting removal of the lock and absconding with the bicycle.

Thus, there is a need for an inexpensive, easily understood and simply operated lock which employs the readily accepted shackle or cable as a locking member, but which renders the bicycle inoperative upon an attempt to rupture the shackle or cable, thereby defeating the purpose of most bicycle thefts.

SUMMARY OF THE INVENTION

It is, therefore, an object of the invention to provide a lock assembly for wheeled vehicles and other devices of tubular frame construction, wherein the lock forms part of the device frame and an attempt to break the lock results in breaking the frame, to render the device inoperative.

A further object of the invention is to provide such a device which includes a shackle or cable portion and which has provision for fixing the shackle or cable portion in a locking position and in a storage position.

With the above and other objects in view, as will hereinafter appear, a feature of the present invention is the provision of a lock assembly for a device having as a component thereof critical for use and/or operation thereof a tubular member. The lock assembly includes a tubular insert for disposition in a gap provided in the tubular member, such that the insert becomes a portion of the tubular member, and a lock member for encircling an anchor means and for making a locking connection to the insert. The insert is provided with a frangible portion which renders the insert more susceptible to breaking than the lock member. Upon breaking of the insert, the tubular member portion is broken to encumber the device with a broken component critical to the operation thereof.

In accordance with a further feature of the invention, there is provided a lock assembly for a wheeled vehicle having an interrupted tubular frame member. The lock assembly comprises a tubular insert for disposition on the frame member to interconnect opposed free ends of the frame member defining said interruption and to form a portion of the frame member to fill said interruption. The assembly further comprises a double-ended lock member, a pair of holes in a wall of the insert for receiving ends of the lock member, and lock means within the insert for locking the lock member in the pair of holes. The insert is provided with a frangible portion rendering the insert more susceptible to breaking than the lock member.

In accordance with a still further feature of the invention, there is provided a lock assembly for a wheeled vehicle having an interrupted tubular frame member. The lock assembly comprises a tubular insert for disposition on the frame member to interconnect free ends of the frame member defining said interruption and to form a portion of the frame member. The assembly further includes a double-ended lock member, a first pair of holes in a wall of the insert for receiving ends of the lock member, a second pair of holes in the wall of the insert offset from the first pair of holes and for receiving the ends of the lock member, and lock means within the insert for locking the lock member in a selected one of the first and second pairs of holes.

In accordance with a still further feature of the invention, there is provided a lock assembly as described above, wherein one end of the lock member is provided with a configuration complementary to a configuration of a head of a bolt retaining another component of the wheeled vehicle or other device.

The above and other features of the invention, including various novel details of construction and combinations of parts, will now be more particularly described with reference to the accompanying drawings and pointed out in the claims. It will be understood that the particular devices embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENTS

Figure 1:
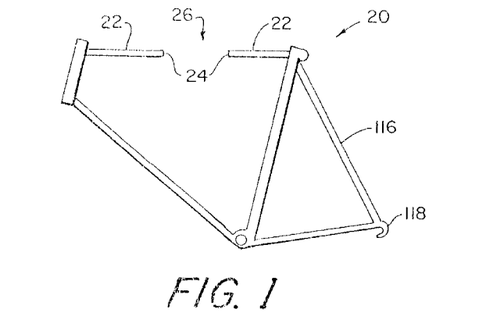
FIG. 1 is a side elevational view of a bicycle frame prepared for receiving a lock assembly of the type described and shown herein.

In FIG. 1 there is shown a tubular frame assembly 20 of the type found in bicycles. A frame member 22 is interrupted to provide free ends 24 defining an interruption, or gap 26, in the frame member 22.

Figure 2:
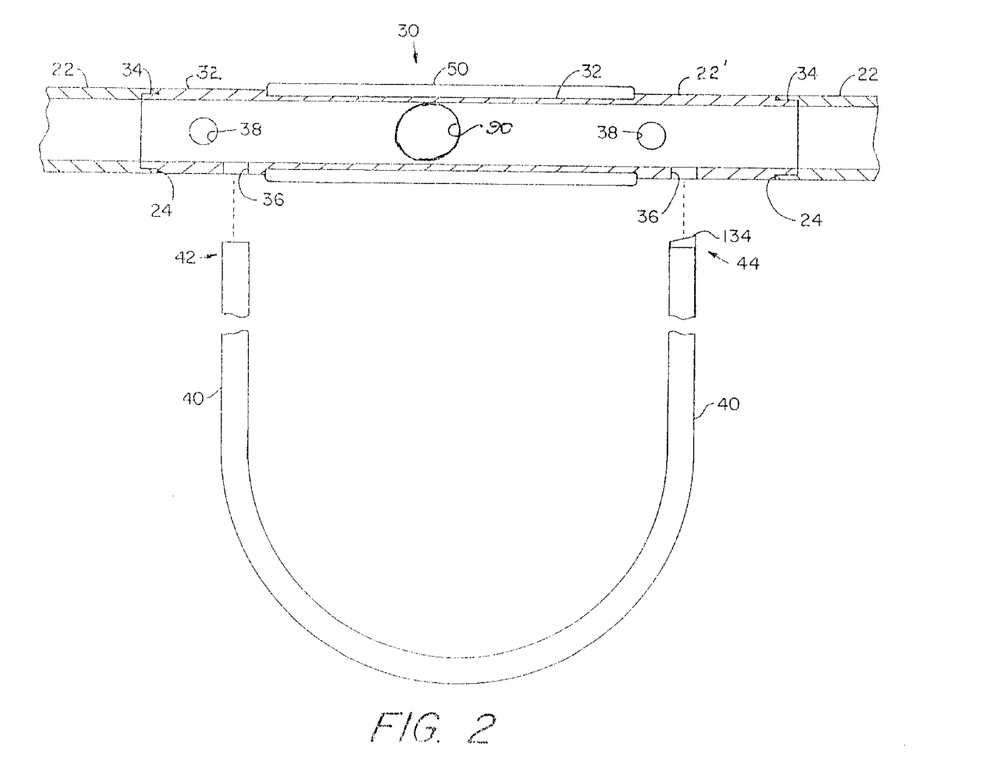
FIG. 2 is an enlarged, partly sectional, view of a lock assembly illustrative of an embodiment of the invention, shown mounted in the frame of FIG. 1.

Referring to FIG. 2, it will be seen that a lock assembly 30 of the present invention includes a tubular insert 32 provided with end portions 34 adapted for joining to the free ends 24 of the frame member 22. The insert 32 is provided with a first pair of holes 36 for receiving a lock member 40 having first and second free ends 42, 44. The first pair of holes 36 is adapted to receive the lock member free ends 42, 44 and are oriented so as to place the lock member 40 in a storage attitude ("A" in FIG. 3). A second pair of holes 38 in the insert 32 is offset from the first pair of holes 36 by about 90° circumferentially of the insert 32 and is adapted to receive the lock member free ends 42, 44 and is oriented so as to place the lock member 40 in a locking position ("B" in FIG. 3).

Figure 3:
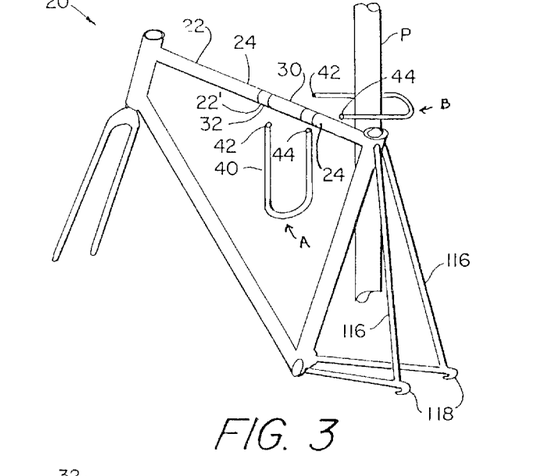
FIG. 3 is a perspective view of the lock assembly of FIG. 2 mounted on the frame of FIG. 1.

As shown in FIGS. 2 and 3, the insert 32 is attached to, and interconnects, the end portions 24 of the frame member 22 which, in FIGS. 1–3, constitutes a "top tube" of a bicycle provided with the gap 26 therein. The insert 32 preferably is of the same material as the frame member 22. If the frame member 22 and the insert 32 are of metal, the insert may be welded or soldered to the frame member. If the frame and insert are of composite materials, or of wood, or plastics, or the like, an appropriate glue may be used. The insert 32 may be covered with a protective sleeve 50 for preventing scratching of the insert with the lock member free ends 42, 44.

The insert 32 easily may be placed in the frame member 22 in the course of manufacture of the bicycle, or other device. However, the insert 32 may also be retrofitted into existing devices by simply cutting the gap 26 in the frame member 22 and fixing the insert 32 therein.

As shown in FIGS. 2 and 3, upon placement of the insert 32 in the frame member 22, the insert becomes a frame member portion 22'. When the frame member constitutes the top tube of a bicycle, the integrity of the frame member 22, 22', is essential to the operability and use of the bicycle. Similarly, in other wheeled vehicles and non-vehicular devices, tubular frame members are necessary for the operation and use of the device.

The lock member 40 may be a rigid shackle-type member, as shown in FIGS. 2 and 3, or may be a flexible cable (not shown) having rigid end portions, substantially as shown with respect to the lock member 40. An example of such a cable may be seen in the aforementioned '577 patent. In either case, the lock member 40 is adapted to encircle an anchoring means, such as a pole P (FIG. 3), or the like.

Figure 4:
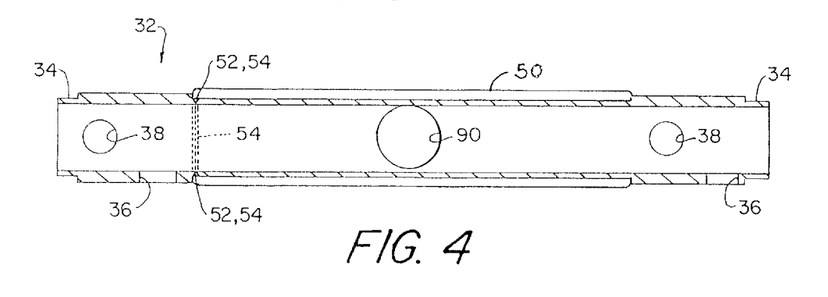
FIG. 4 is an enlarged sectional view of an insert portion of the lock assembly of FIG. 3.

Referring to FIG. 4, it will be seen that the insert 32 is provided with a frangible portion 52 which is rendered frangible by a groove 54 or other of many known means for weakening a tube, as for example, by serrations, a series of holes or slots, or the like.

The frangible portion 52 renders the insert 32 more susceptible to breaking than the lock member 40. Thus, the application of pressure upon lock member 40 in an effort to rupture lock member 40 will first break insert 32, at the frangible portion 52 thereof, thereby breaking the frame member 22, 22', thereby rendering the bicycle inoperative and useless. After breaking of the bicycle top tube, further efforts could result in breaking of the lock member 40 and would enable removal of the bicycle from its anchoring means. However, experience has shown that thieves usually are not interested in inoperative or obviously damaged bicycles.

Figure 6:
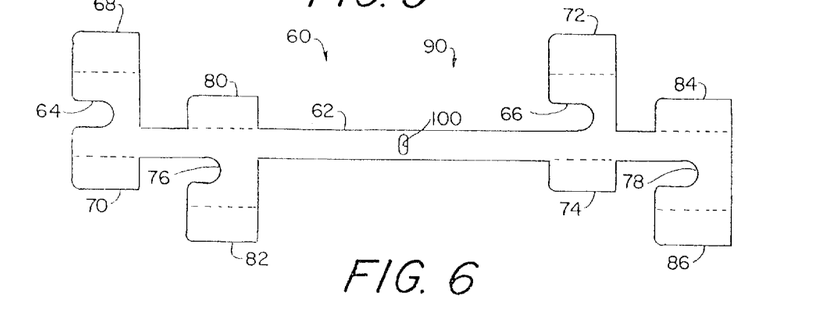
FIG. 6 is a plan view of flat stock from which is made a plunger for disposal within the lock assembly insert portion of FIGS. 2 and 4.

Disposed in the insert 32 is a lock means 60 (FIGS. 6–8) for engaging one or both of the ends 42, 44 of lock member 40 to secure the lock member 40 in the insert 32. At least one of the lock member ends 42, 44 is provided with one or more grooves 46 (FIGS. 7 and 8) engageable by the lock means 60 to effect the securement of the lock member 40 in the insert 32.

Figure 7:
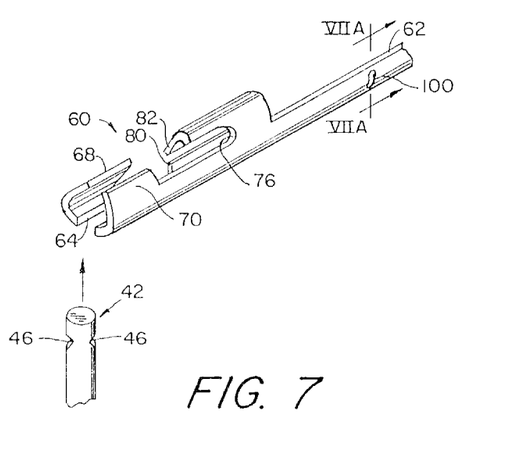
FIG. 7 is a perspective exploded view showing a portion of the plunger formed from the flat stock shown in FIG. 6 in combination with a portion of a lock member of FIGS. 2 and 3.
Figure 7A:
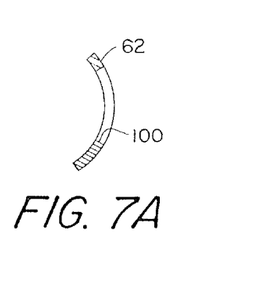
FIG. 7A is a sectional view taken along line VIIA—VIIA of FIG. 7.

In FIG. 7, there is shown a portion of one illustrative lock means 60 comprising a rod, or plunger, 62 that is adapted to be slidably disposed in the insert 32. The plunger 62 is provided with slot means, including slots 64 and 66 (FIG. 6) which are movable axially of the insert 32 to pass around ends 42, 44 of lock member 40, and opposed flanges 68, 70 and 72, 74 (FIGS. 5 and 6) for sliding into lock member grooves 46 (FIG. 8) to lock the lock member ends 42, 44 in the insert 32 in position "A", as shown in FIG. 3. Similarly, the plunger 62 is provided with slot means, including slots 76, 78 which are movable axially to pass around lock member ends 42, 44 and opposed flanges 80, 82 and 84, 86 for sliding into the lock member grooves 46 to lock the lock member 40 in the insert 32 in position "B", as shown in FIG. 3. The plunger 62 may be formed from flat stock 90 (FIG. 6) and then shaped as shown in FIGS. 7, 7A and 8.

While the ends 42, 44 of the lock member 40 are shown in FIGS. 2 and 3 as being lockable in the insert 32 by the lock member 40, it will be apparent that one of the ends 42, 44 could be of a J-shaped configuration (not shown) and held in one of the insert holes 36, 38 by its own configuration, while the other of the ends 42, 44 is susceptible to locking engagement with the axially movable plunger 62, as aforesaid. Examples of shackles each having a J-shaped free end appear in the aforesaid '854 and '231 patents.

Figure 5:
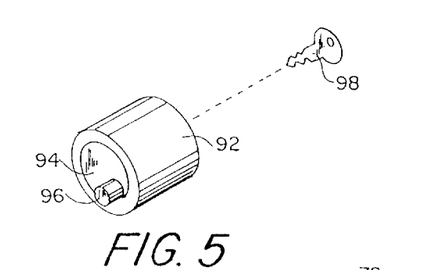
FIG. 5 is a perspective exploded view of a lock cylinder assembly mounted in the lock assembly of FIGS. 2 and 4.

Referring to FIGS. 4 and 5, it will be seen that the insert 32 is provided with an opening 91 for receiving and retaining a lock housing 92 in which is rotatably disposed a lock cylinder 94 having a drive pin 96 extending therefrom (FIG. 5). The lock cylinder 94 receives a key 98 by which the lock cylinder 94 may be rotated in the housing 92. The drive pin 96 extends through an elongated hole 100 in the plunger 62. Movement of the drive pin 96 in response to turning of the lock cylinder 94, causes axial movement of the plunger 62 to engage and disengage from the lock member 40.

Figures 8, 9, 10:
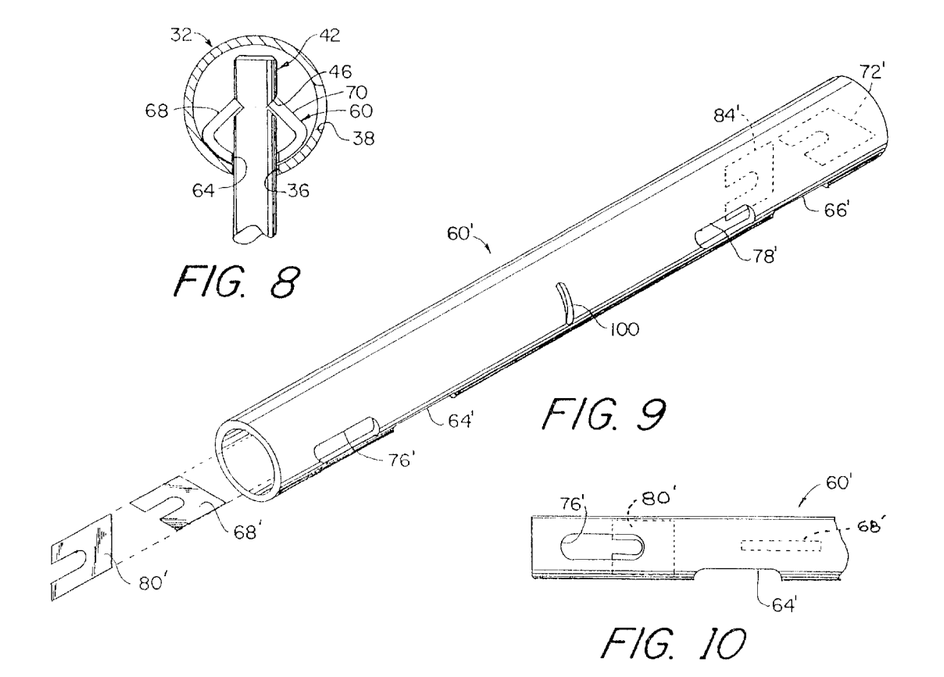
FIG. 8 is a sectional view of the lock member portion and plunger of FIG. 7 and the insert portion of FIGS. 2 and 4.
FIG. 9 is an exploded perspective view of an alternative embodiment of plunger.
FIG. 10 is an elevational view of a portion of the plunger of FIG. 9.

In FIGS. 9 and 10, there is shown an alternative lock means in the form of a lock tube or plunger 60' having slots 64', 66', 76', 78' which receive lock member ends 42, 44 and flanges 68', 72', 80', 84' which engage the grooved lock member ends. Flanges 68', 72', 80', and 84' are mounted within and fixed to lock tube 60'. Flanges 68' and 72' are oriented at a right angle to flanges 80' and 84'. It will be apparent that many known locking mechanisms for operation in a tubular housing to secure post members therein could be acceptable in the system described herein. The plungers of FIGS. 6–10 are shown as examples of lock means found to be satisfactory in operation and inexpensive to make.

Figure 14:
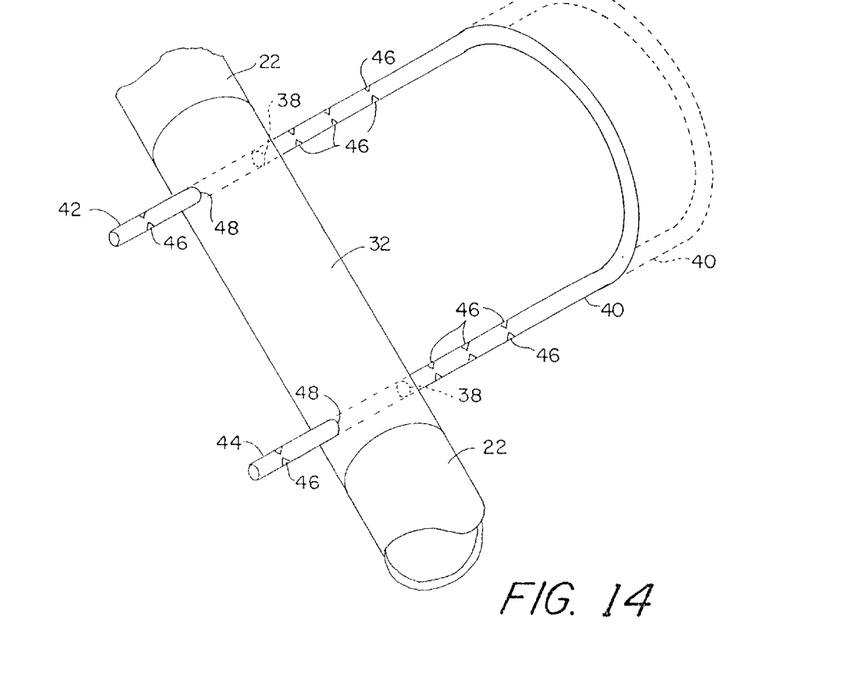
FIG. 14 is a perspective view illustrative of an alternative feature of the invention.

As illustrated in FIG. 14, the lock member 40 may be provided with a series of the grooves 46 and the insert 32 may be provided with a third pair of holes 48 in alignment with the second pair of holes 38 and opposite thereto. The arrangement of holes 38, 48 permits the lock member 40 to be extended through both pairs of holes and thereby through the frame member 22. An operator may move the lock member 40 in the insert 32 to select a length of lock member desired to be exposed in a direction towards the anchoring means P (FIG. 3) and by operation of the lock means 60 engage the lock member 40 in the insert 32 to secure the lock member 40 in the selected position. Thus, in this embodiment, the length of the loop formed by the closed end of the lock member 40 and insert 32 is selectable.

Figures 11, 12, 13:
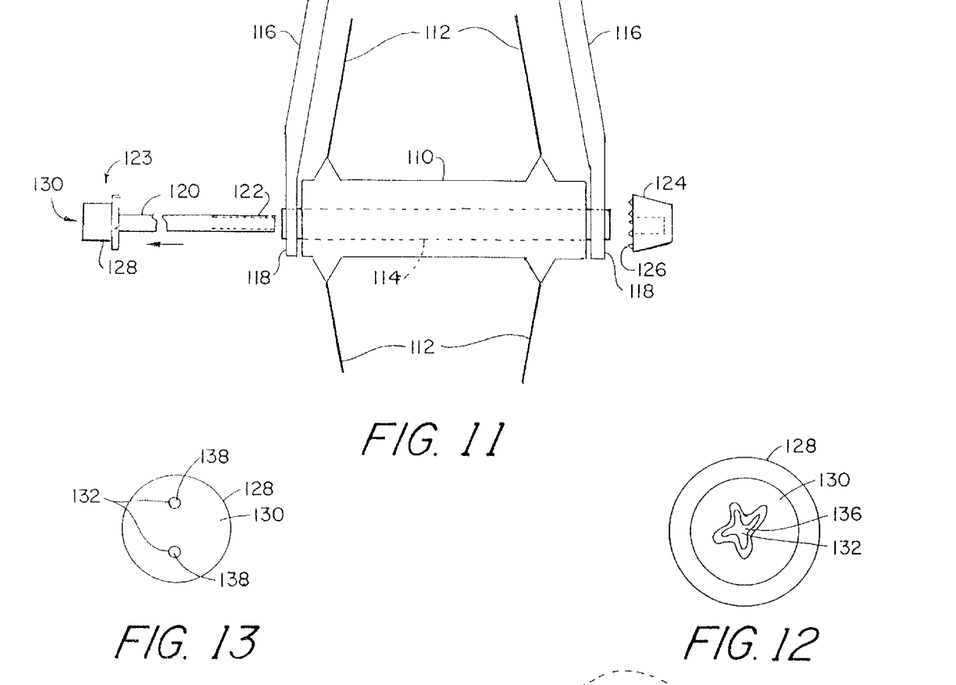
FIG. 11 is an elevational view of a wheel axle assembly releasably mounted on frame portions shown in FIGS. 1 and 3.
FIGS. 12 and 13 are end views of a nut for locking the axle of FIG. 11 to the frame portions of FIGS. 1 and 3.

In FIG. 11 there is shown a wheel axle assembly including a hollow wheel hub 110 on which are mounted spokes 112 and in which is disposed a central sleeve 114 which extends beyond the ends of the hub 110. Seat stay portions 116 of the frame include hook portions 118 that receive the ends of sleeve 114 extending beyond the hub 110. Sleeve 114 and stays 116 are secured together by an elongated bolt 120 threaded at one end 122 to receive a tapered nut 124 having teeth 126 thereon for making a gripping contact with the adjacent hook portion 118. The opposite end 123 of the bolt 120 removed from the threaded end 122 has a bolt head 128 having an outboard end 130 provided with one or more recesses of a selected and preferably unique configuration, e.g. a pair of circular recesses 138 in FIG. 13 or a recess 136 of arbitrary shape in FIG. 12.

Referring again to FIG. 2, one free end 44 of lock member 40 preferably, but not necessarily, is provided with at least one protrusion 134 complementary to the recess or recesses 136 or 138 of FIGS. 12 and 13. If it is desired to remove a wheel, the lock assembly 30 is unlocked, the lock member 40 withdrawn from the insert 32, and the protrusion 134 is mated with the recess means 132 in the bolt head outboard end 130. A turn of lock member 40, by leverage on the non-engaged leg of the lock member 40, loosens the bolt 120, the nut 124 being retained in place by the engagement of the teeth 126 thereon with a seat stay hook portion 118. Removal of the bolt 120 permits ready removal of the wheel.

The outboard end 130 of the bolt head 128 may be provided with any selected configuration of recess 132, such as a uniquely-configured recess 136 (FIG. 12), or an arrangement of one or more holes 138 (FIG. 13). It will be apparent that alternatively, the bolt head 128 can be provided with a protrusion (not shown) and the lock member 40 with a complementary recess (not shown). The bolt head outboard end 130 and the lock member free end 44 are only required to be complementary to each other to facilitate engagement therebetween.

When the vehicle, or other such device, is in use, the lock member 40 is secured in insert holes 36 so as to be positioned in an out-of-the-way manner, as illustrated by position "A" in FIG. 3. In this position, the lock member ends 42, 44 are disposed in plunger grooves 64, 66 and engaged by plunger flanges 68, 70, 72, 74. The plunger 62 is held in place by drive pin 96.

When the vehicle is to be locked, the key 98 is turned to rotate the lock cylinder 94, to move the drive pin 96, which moves the plunger 62 axially such that the flanges 68, 70 and 72, 74 disengage from the lock member ends 42, 44 and permit withdrawal of the lock member 40 from the insert 32. If it is desired to remove a wheel as an extra precaution, an operator engages lock member protrusion 134 with recess means 132 to loosen the bolt 120 to remove the wheel.

The ends 42, 44 of the lock member 40 are entered into holes 38 wherein the ends 42, 44 pass through slots 76 and 78 and are engaged by flanges 80, 82 and 84, 86, upon turning of the key 98. The lock member 40, disposed in position B (FIG. 3), encircles post P or other anchoring means to prevent removal of the frame assembly 20.

If an attempt is made to rupture the lock member 40, as by applying spreading pressure thereto, the frangible portion 52 of the insert 32 gives way. The attempted spreading of the legs of the lock member 40 causes the lock member end 42 to pull leftwardly, as viewed in the drawings, and out of slot 76 and away from flanges 80, 82, and at the same time moves lock member end 44 rightwardly, causing the flanges 84, 86 to move rightwardly to further pull the plunger off the lock member end 42. Thus, breaking of the insert 32 loosens the plunger 62 in the insert 32 such that the plunger offers little or no support to the structural integrity of the broken frame member. Thus, the vehicle is inoperative and the problem is readily observable.

There is thus provided a lock assembly for wheeled vehicles and other devices of tubular frame constructions, wherein the lock forms part of the frame of the device and an attempt to break the lock causes breakage of a frame portion, which frame portion is essential to the use and/or operation of the device. There is further provided a lock assembly having facility for being locked to a device in a storage position and, alternatively, in a locking position. There is still further provided a lock assembly wherein a portion thereof can be used as a wrench for tightening and loosening components of the device bolted together.

It is to be understood that the present invention is by no means limited to the particular construction herein disclosed and/or shown in the drawings, but also comprises any modifications or equivalents within the scope of the claims. For example, while the invention is shown and described in use on a bicycle, it will be apparent that the lock assembly shown and described herein finds utility with respect to other devices having tubular components critical to the use and/or operation thereof, such as lawn furniture, tools, and the like, and other wheeled vehicles, such as tricycles, wheel chairs, and the like.

Having thus described my invention, what I claim as new and desire to secure by Letters Patent of the United States is:

1. A lock assembly comprising:
a lock member for encircling an anchoring means, said lock member having first and second end portions;
a tubular insert member having (a) first and second opposite ends for connection to the mutually confronting ends of first and second frame members of a device that is to be secured to said anchoring means by said lock assembly, (b) first and second holes for receiving said first and second end portions respectively of said lock member, and (c) a frangible portion located between said first and second ends thereof which renders said insert member susceptible to breaking into two parts, one part including said first end of said insert member and said first hole and the other part including said second end of said insert member and said second hole; and
locking means having a movable means within said insert member that is adapted to releasably interlock with at least one end portion of said lock member disposed in one of said holes so as to lock said at least one end portion to said insert member, said movable means being slidable in said insert member between a first unlocking position in which it is free of interlocking engagement with said lock member and a second locking position in which it engages and is interlocked with at least one of said end portions of said lock member.

2. A lock assembly according to claim 1 wherein said lock member is U-shaped and is made of a rigid material.

3. A lock assembly according to claim 1 further including a key-operated lock mechanism (92, 94) attached to said insert member, said key-operated lock mechanism being connected to said movable means whereby operation of said lock mechanism in one direction will move said movable means to said first unlocking position and operation of said lock mechanism in a second opposite direction will move said movable means to said second locking position.

4. A lock assembly according to claim 3 wherein said movable means comprises a plunger slidably disposed in said insert member and movable between said first unlocking position and said second locking position, said plunger being adapted to interlock with said lock member when it is moved from said first unlocking position to said second locking position, and further wherein said lock mechanism comprises a housing (92) mounted in an opening in said insert member, a cylindrical lock body (94) rotatably disposed in said housing, and a drive pin (96) extending from said lock body and disposed in a drive hole (100) in said plunger, wherein rotative movement of said lock body in said housing causes said drive pin to move said plunger between said first unlocking position and said second locking position.

5. A lock assembly according to claim 1 wherein said at least one end portion of said lock member has a groove therein (46), and said movable means comprises a plunger (62) disposed in said insert member and movable between said first unlocking position and said second locking position, said plunger having a portion thereof that is disposed to enter said groove and thereby interlock with said lock member when said plunger is moved to its said second locking position.

6. A lock assembly according to claim 5 wherein said plunger is made of a sheet metal and is curved and slotted so as to provide a slot (64) for receiving an end portion of said lock member positioned in said first hole and a flange portion (68 or 70) that is adapted to mate with said groove when said plunger is moved to said second locking position.

7. A lock assembly according to claim 6 wherein each of said end portions of said lock member has a groove therein, and said plunger has two slots (64, 66) and two flanges (68 or 70, 72 or 74), with said slots and flanges being spaced along said plunger so that when said end portions of said lock member are positioned in said holes and said plunger is in said second locking position, said end portions will be embraced by the slots of said plunger and said flanges will reside in said grooves in interlocking relation with said lock member.

8. A lock assembly according to claim 1 wherein said insert member has a reduced diameter at each of its opposite ends to facilitate connection to first and second frame members of a device that is to be secured to an anchoring means by said lock assembly.

9. In combination with a cycle frame (20) that includes first and second tubular frame members (22) having mutually confronting ends (24) that are spaced from one another so as to provide a gap (26) therebetween; a lock assembly for locking said cycle to an anchoring device (P), said lock assembly comprising:
a lock member (40) for encircling an anchoring means (P), said lock member having first and second end portions (42,44);
a tubular insert member (32) disposed in said gap, said insert member having (a) first and second opposite ends (34) that are connected to said mutually confronting ends of said first and second frame members, (b) first and second holes (38) for receiving said first and second end portions (42, 44) respectively of said lock member, and (c) a frangible portion (52) adjacent to said first end (34) thereof which renders said insert member susceptible to breaking into two parts, one part including said first end (34) of said insert member and said first hole (38) and the other part including said second end (34) of said insert member and said second hole (38); and
locking means (60) having a movable means (62) within said insert member that is adapted to releasably interlock with at least one end portion (42) of said lock member disposed in one of said holes (38) so as to lock said at least one end portion (42) to said insert member, said movable means being slidable in said insert member between a first unlocking position in which it is free of interlocking engagement with said lock member and a second locking position in which engages and is interlocked with at least one of said end portions of said lock member.

10. The combination according to claim 9 wherein said lock member is U-shaped and rigid.

11. The combination according to claim 9 wherein at least one end portion of said lock member has a groove (46) therein, and said movable means comprises a plunger (62) slidably disposed in said insert member and movable between said first unlocking position and said second locking position, said plunger having a portion thereof that is disposed to enter said groove and thereby interlock with said lock member when said plunger is moved to its said second locking position.

12. The combination according to claim 9 further including a key-operated lock mechanism (92,94) attached to said insert member, said key-operated lock mechanism being connected to said movable means (62) whereby operation of said lock mechanism in one direction will move said movable means to said first unlocking position and operation of said lock mechanism in a second opposite direction will move said movable means to said second locking position.

13. The combination according to claim 12 wherein said movable means comprises a plunger slidably disposed in said insert member, said plunger being adapted to interlock with said lock member when it is moved from said first unlocking position to said second locking position, and further wherein said lock mechanism comprises a housing (92) mounted in an opening in said insert member, a cylindrical lock body (94) rotatably disposed in said housing, and a drive pin (96) extending from said lock body and disposed in a drive hole (100) in said plunger, whereby rotative movement of said lock body in said housing causes said drive pin to move said plunger axially to selectively engage with and disengage from said lock member.

14. The combination according to claim 11 wherein said plunger is made of a sheet metal and is curved and slotted so as to provide a slot (64) for receiving an end portion of said lock member positioned in said first hole and a flange portion (68 or 70) that is adapted to mate with said groove when said plunger is moved to said second locking position.

15. The combination according to claim 14 wherein each of said end portions of said lock member has a groove therein, and said plunger has two slots and two flanges, with said slots and flanges being spaced along said plunger so that when said end portions of said lock member are positioned in said first and second holes (38) and said plunger is in said second locking position, said end portions will be embraced by the slots of said plunger and said flanges will reside in said grooves in interlocking relation with said lock member.

16. The combination of claim 9 wherein said insert member has a reduced diameter end section at at least one of its opposite ends, and said reduced diameter end section is inserted into one of said mutually confronting ends of said first and second frame members.

17. A lock assembly for locking to an anchoring means (P) a device that is characterized by first and second tubular frame members (22) with mutually confronting ends (24) that are spaced from one another so as to provide a gap therebetween; said lock assembly comprising:

a lock member (40) for encircling an anchoring means (P), said lock member having first and second end portions (42,44);

a tubular insert member (32) for disposition in said gap, said insert member having (a) first and second opposite ends (34) adapted to be connected to the mutually confronting ends of said first and second frame members, (b) first and second holes (38) for receiving said first and second end portions respectively of said lock member, and (c) a frangible portion (52) adjacent to said first end thereof which renders said insert member susceptible to breaking into two parts, one part including said first end of said insert member and said first hole and the other part including said second end of said insert member and said second hole; and locking means (60) having a movable plunger (62) within said insert member that is adapted to releasably interlock with at least one end portion of said lock member disposed in one of said holes so as to lock said at least one end portion to said insert member, said movable plunger being slidable in said insert member between a first unlocking position in which it is free of interlocking engagement with said lock member and a second locking position in which it engages and is interlocked with at least one of said end portions of said lock member.

\* \* \* \* \*

UNITED STATES PATENT AND TRADEMARK OFFICE
CERTIFICATE OF CORRECTION

PATENT NO. : 5,832,753
DATED : 11/10/98
INVENTOR(S) : Peter M. Nielsen

It is certified that error appears in the above-identified patent and that said Letters Patent is hereby corrected as shown below:

Claim 5, column 7, line 66, before the word "therein" insert the numeral -- 46 --, and after the word "therein" delete the numeral -- 46 --.

Claim 9, column 8, line 57, after the word "which", insert the word -- it --.

Signed and Sealed this

Sixth Day of April, 1999

Attest:

Q. TODD DICKINSON

*Attesting Officer*  *Acting Commissioner of Patents and Trademarks*